(12) United States Patent
Iida et al.

(10) Patent No.: US 9,956,882 B2
(45) Date of Patent: May 1, 2018

(54) ELECTRIC POWER STORAGE SYSTEM

(71) Applicant: TOYOTA JIDOSHA KABUSHIKI KAISHA, Toyota-shi, Aichi-ken (JP)

(72) Inventors: Tomoaki Iida, Okazaki (JP); Hiromasa Tanaka, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 274 days.

(21) Appl. No.: 14/995,817

(22) Filed: Jan. 14, 2016

(65) Prior Publication Data
US 2016/0207403 A1 Jul. 21, 2016

(30) Foreign Application Priority Data

Jan. 16, 2015 (JP) ................................. 2015-007221

(51) Int. Cl.
| | |
|---|---|
| B60L 11/02 | (2006.01) |
| H02J 1/00 | (2006.01) |
| H02J 7/00 | (2006.01) |
| B60L 11/18 | (2006.01) |
| H02M 3/04 | (2006.01) |

(Continued)

(52) U.S. Cl.
CPC ............... *B60L 11/02* (2013.01); *B60L 1/003* (2013.01); *B60L 11/126* (2013.01); *B60L 11/14* (2013.01); *B60L 11/1812* (2013.01); *B60L 11/1816* (2013.01); *B60L 11/1868* (2013.01); *B60W 10/00* (2013.01); *H02J 1/00* (2013.01); *H02J 7/00* (2013.01); *H02M 3/04* (2013.01); *H02M 7/44* (2013.01); *B60L 2260/26* (2013.01); *Y02T 10/6217* (2013.01); *Y02T 10/7005* (2013.01); *Y02T 10/7066* (2013.01); *Y02T 10/7072* (2013.01); *Y02T 10/7077* (2013.01); *Y02T 10/92* (2013.01); *Y02T 90/127* (2013.01); *Y02T 90/14* (2013.01)

(58) Field of Classification Search
CPC ....................................................... B60L 11/02
USPC ........................................................ 307/10.1
See application file for complete search history.

(56) References Cited

U.S. PATENT DOCUMENTS

| | | | |
|---|---|---|---|
| 5,793,189 A * | 8/1998 | Kawaguchi | ......... B60L 11/1859 320/125 |
| 2012/0299377 A1* | 11/2012 | Masuda | ................ B60L 11/005 307/10.1 |

FOREIGN PATENT DOCUMENTS

| | | |
|---|---|---|
| JP | 8-98324 A | 4/1996 |
| JP | 2011-109794 A | 6/2011 |

(Continued)

*Primary Examiner* — Joseph Chang
(74) *Attorney, Agent, or Firm* — Sughrue Mion, PLLC

(57) ABSTRACT

An electric power storage system for a vehicle includes: an electric power storage device; a converter configured to perform voltage conversion between the device and the motor; a DC/DC converter configured to step down an output voltage to an auxiliary machine or an auxiliary machine battery; a charger configured to charge the device with external electric power; and first and second relays disposed on first and second connection lines connecting the device to the converter, respectively. One end of the DC/DC converter is connected to the first connection line between the first relay and the converter and the other end is connected to the second connection line between the device and the second relay. The charger is disposed on a current path capable of charging the device with the external electric power when the first relay is in an ON state and the second relay is in an OFF state.

11 Claims, 6 Drawing Sheets

(51) Int. Cl.
    *H02M 7/44* (2006.01)
    *B60L 1/00* (2006.01)
    *B60L 11/12* (2006.01)
    *B60L 11/14* (2006.01)
    *B60W 10/00* (2006.01)

(56) References Cited

FOREIGN PATENT DOCUMENTS

| | | |
|---|---|---|
| JP | 2011-205755 A | 10/2011 |
| JP | 2013-017357 A | 1/2013 |
| JP | 2014-42406 A | 3/2014 |
| JP | 2014-93822 A | 5/2014 |

\* cited by examiner

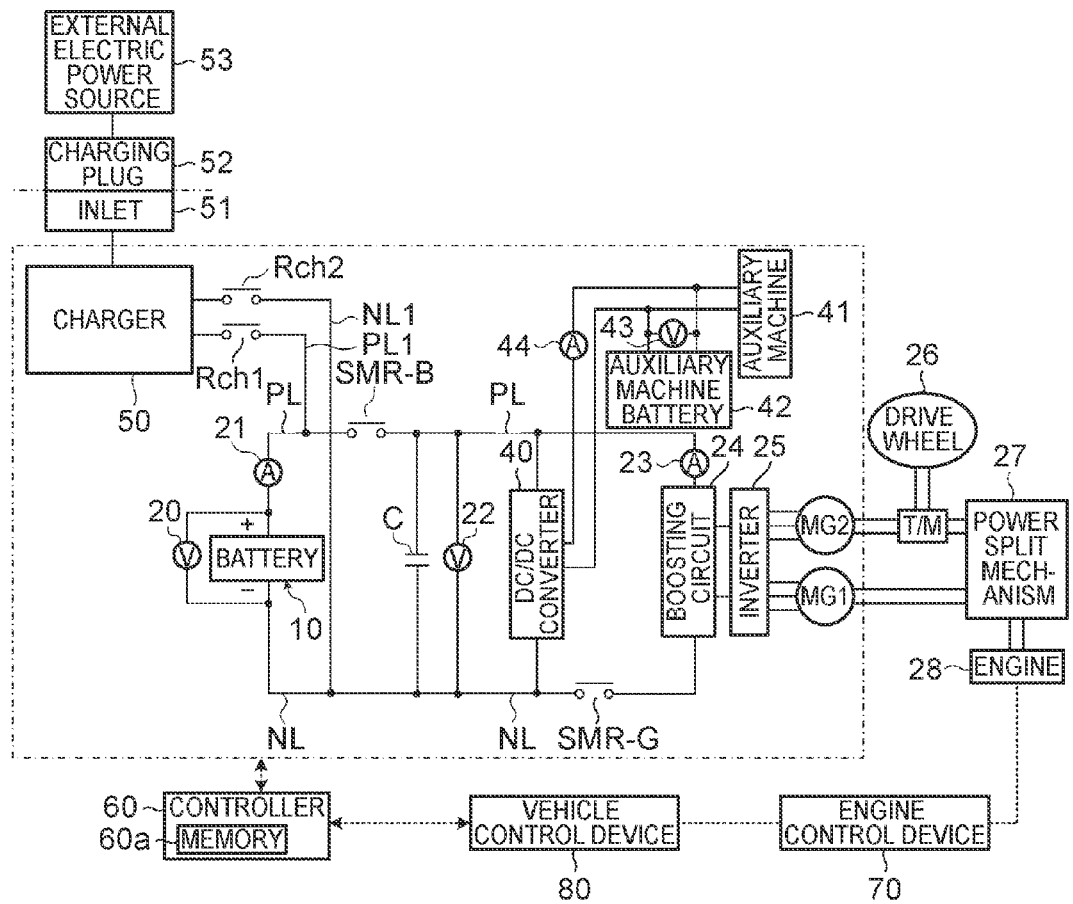

FIG. 4
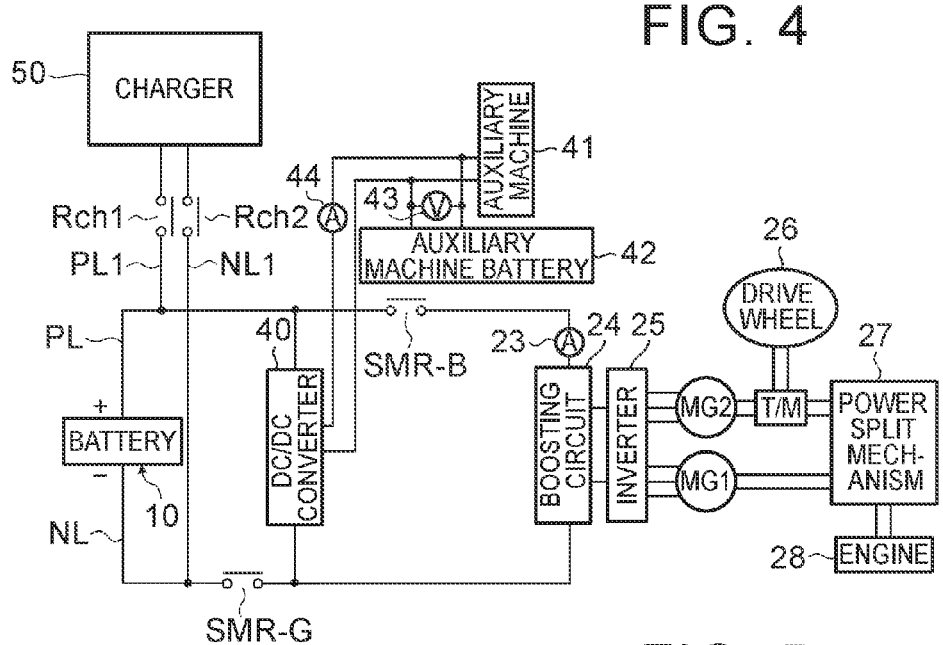
FIG. 5
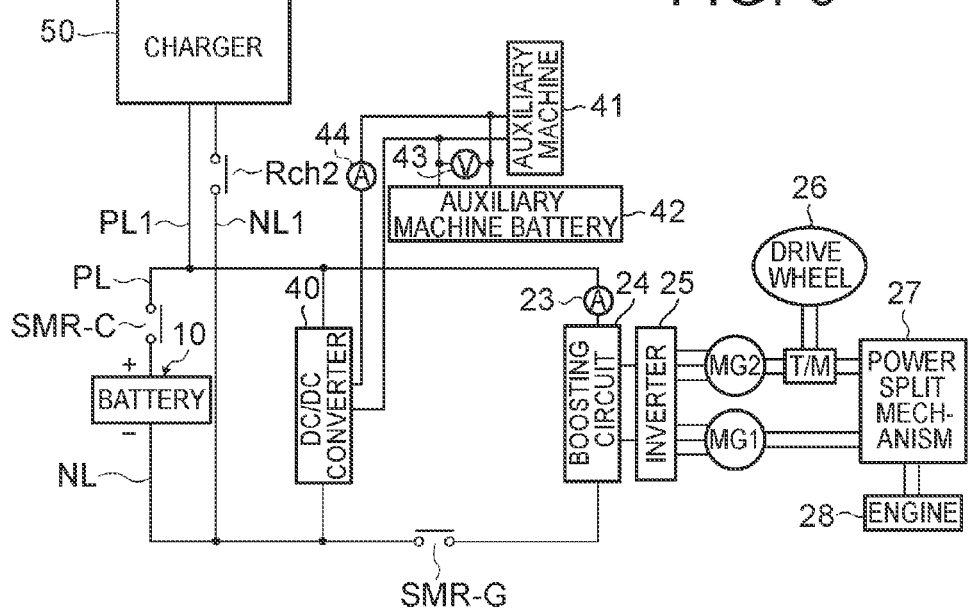
FIG. 6
|  | ON/OFF STATE OF RELAY DEVICE | | | STATE OF DC/DC CONVERTER 40 |
|---|---|---|---|---|
|  | SMR-C | SMR-G | Rch2 |  |
| IG-OFF | OFF | OFF | OFF | STATIONARY |
| IG-ON | ON | ON | OFF | IN OPERATION |
| EXTERNAL CHARGING | ON | OFF | ON | IN OPERATION |
| BATTERY-LESS TRAVELING | OFF | ON | OFF | IN OPERATION (ELECTRIC POWER GENERATED BY MG1) |

ELECTRIC POWER STORAGE SYSTEM

INCORPORATION BY REFERENCE

The disclosure of Japanese Patent Application No. 2015-007221 filed on Jan. 16, 2015 including the specification, drawings and abstract is incorporated herein by reference in its entirety.

BACKGROUND OF THE INVENTION

1. Field of the Invention

The invention relates to an electric power storage system mounted in a vehicle.

2. Description of Related Art

Japanese Patent Application Publication No. 2013-17357 (JP 2013-17357 A) discloses a plug-in vehicle and a battery system that is capable of charging a battery with external electric power via a charger (external charging). The battery system that is disclosed in JP 2013-17357 A has a circuit configuration that allows a main battery supplying electric power to a traveling motor to be charged and an auxiliary machine battery to be charged when the external charging is performed.

According to JP 2013-17357 A, however, the main battery and an inverter or the like connected to the traveling motor should be connected to each other for the auxiliary machine battery to be charged during the external charging via the charger. In addition, a boosting circuit or the like can be disposed between the main battery and the inverter. Accordingly, when the auxiliary machine battery is charged, electric power for external charging flows through the inverter and a boosting circuit via the charger, and thus durability of these converters is reduced.

The auxiliary machine battery can also be charged with electric power for external charging via the charger prevented from flowing through the inverter and the boosting circuit. For example, another DC/DC converter for the auxiliary machine battery that is connected to another auxiliary machine battery is disposed on the charger side. In this case, however, the dedicated DC/DC converter for charging the auxiliary machine battery via the charger is provided in a state where connection between the main battery and a load is blocked, and thus the number of components increases and a physique (size) of the system as a whole including the main battery increases to cause a problem.

SUMMARY OF THE INVENTION

The invention provides an electric power storage system that includes an electric power storage device which supplies electric power to a traveling motor of a vehicle, is capable of charging with external electric power, suppresses a reduction in durability of a converter which performs voltage conversion between the electric power storage device and the traveling motor, and has a reduced number of components.

An electric power storage system according to an aspect of the invention includes an electric power storage device supplying electric power to a traveling motor of a vehicle, a converter performing voltage conversion between the electric power storage device and the traveling motor, a DC/DC converter disposed on a current path between the electric power storage device and the converter and stepping down an output voltage from the current path to an auxiliary machine and/or an auxiliary machine battery mounted in the vehicle, a charger for charging the electric power storage device with external electric power supplied from an external electric power source, a first relay disposed on a first connection line as one of positive and negative electrodes connecting the electric power storage device to the converter, and a second relay disposed on a second connection line as the other one of the positive and negative electrodes connecting the electric power storage device to the converter.

One end of the DC/DC converter is connected to the first connection line between the first relay and the converter and the other end of the DC/DC converter is connected to the second connection line between the electric power storage device and the second relay. The charger is disposed on a current path capable of charging the electric power storage device with the external electric power when the first relay is in an ON state and the second relay is in an OFF state.

According to the above-described aspect of the invention, the charger is connected to both the electric power storage device and the DC/DC converter in a state where the current path between the electric power storage device and the converter is blocked (in a state where the first relay is in the ON state and the second relay is in the OFF state). Accordingly, during external charging for charging the electric power storage device with the external electric power, the electric power storage device can be charged by the current path through which no charging current flows to the converter, and a current path leading to the auxiliary machine and/or the auxiliary machine battery via the DC/DC converter is ensured even without a connection to the converter.

Accordingly, the external electric power (external charging current) does not flow through the converter during the external charging, and thus a reduction in durability of the converter can be suppressed. In addition, the single DC/DC converter is shared for both an output to the auxiliary machine and/or the auxiliary machine battery from the current path between the electric power storage device and the converter and an output to the auxiliary machine battery during the external charging, and thus the number of components can be reduced and an increase in a physique (size) of the battery system as a whole can be suppressed.

The vehicle can be a hybrid vehicle provided with an engine as a driving source for traveling of the vehicle. The electric power storage system can be configured to further include a generator connected to the converter and generating electric power by receiving power of the engine and a controller controlling charging and discharging of the electric power storage device. In this case, the controller can perform a control such that the electric power generated by the generator is supplied to the auxiliary machine or the auxiliary machine battery via the DC/DC converter while controlling the first relay to be OFF and the second relay to be ON during the traveling of the vehicle using the engine as the driving source with the electric power supply from the electric power storage device to the traveling motor blocked.

According to this configuration, the current path to the auxiliary machine and/or the auxiliary machine battery via the DC/DC converter is ensured while the electric power supply from the electric power storage device to the traveling motor is blocked during the traveling of the vehicle using the engine as the sole power source (battery-less traveling), and the electric power that is generated by the generator can be supplied to the auxiliary machine or the auxiliary machine battery even when the battery-less traveling is performed. Accordingly, the single DC/DC converter allows electric power to be supplied to the auxiliary machine battery while preventing the external electric power from flowing through the converter during the external charging and allows the electric power that is generated by the generator to be supplied to the auxiliary machine or the auxiliary machine battery via the DC/DC converter even during the battery-less traveling. Since the single DC/DC converter can be shared, the number of components can be reduced and the reduction in the durability of the converter can be suppressed.

The electric power storage system described above can further include a third relay disposed on a first charging line as one of positive and negative electrodes connecting the electric power storage device to the charger, a fourth relay disposed on a second charging line as the other one of the positive and negative electrodes connecting the electric power storage device to the charger, and a controller performing an external charging control for charging the electric power storage device with the external electric power. In this case, the controller can connect the electric power storage device and the charger to each other by turning ON the third relay and the fourth relay and perform a control such that the external electric power is supplied to the auxiliary machine battery via the DC/DC converter while controlling the first relay to be ON and the second relay to be OFF.

The electric power storage system described above can further include a first charging line as one of positive and negative electrodes connecting the electric power storage device to the charger, a second charging line as the other one of the positive and negative electrodes connecting the electric power storage device to the charger, a third relay disposed on the first charging line, and a controller performing an external charging control for charging the electric power storage device with the external electric power. In this case, the second charging line can be connected to the first connection line between the first relay and the DC/DC converter. The controller can connect the electric power storage device and the charger to each other by turning ON the first relay and the third relay and perform a control such that the external electric power is supplied to the auxiliary machine battery via the DC/DC converter while controlling the second relay to be OFF.

The vehicle can be a hybrid vehicle provided with an engine as a driving source for traveling of the vehicle. The electric power storage system can further include a generator connected to the converter and generating electric power by receiving power of the engine, a first current sensor detecting a current flowing through the converter, and a failure detection unit detecting an ON failure of the second relay based on a current value detected by the first current sensor. The failure detection unit can determine that the second relay is subjected to the ON failure when the detected current value exceeds a predetermined value in a state where the first relay and the second relay are controlled to be OFF and in a state where the electric power generated by the generator is output to the DC/DC converter via the converter.

The electric power storage system can be configured to further include a second current sensor detecting a current flowing through the electric power storage device and a failure detection unit detecting an ON failure of the first relay based on a current value detected by the second current sensor. In this case, the failure detection unit can determine that the first relay is subjected to the ON failure when the current value detected by the second current sensor exceeds a predetermined value in a state where the first relay and the second relay are controlled to be OFF and in a state where electric power is output to the DC/DC converter from the electric power storage device.

The DC/DC converter can be provided with a boosting function for boosting an output voltage of the auxiliary machine battery and outputting the boosted output voltage to the current path between the electric power storage device and the converter in addition to a step-down function for stepping down the output voltage from the current path between the electric power storage device and the converter to the auxiliary machine and/or the auxiliary machine battery. The above-described electric power storage system can further include a first current sensor detecting a current flowing through the converter and a failure detection unit detecting an ON failure of the second relay based on a current value detected by the first current sensor. In this case, the failure detection unit can determine that the second relay is subjected to the ON failure when the current value detected during a boosting operation of the DC/DC converter exceeds a predetermined value in a state where the first relay and the second relay are controlled to be OFF.

In addition, the above-described electric power storage system can further include a second current sensor detecting a current flowing through the electric power storage device and a failure detection unit detecting an ON failure of the first relay based on a current value detected by the second current sensor. The failure detection unit can determine that the first relay is subjected to the ON failure when the current value detected by the second current sensor during a step-down operation of the DC/DC converter exceeds a predetermined value in a state where the first relay and the second relay are controlled to be OFF.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a drawing illustrating a configuration of a battery system mounted in a vehicle according to Embodiment 1;

FIG. 2 is a drawing showing ON/OFF states of relay devices depending on behaviors of the vehicle according to Embodiment 1;

FIG. 4 is a schematic configuration diagram for a first modification example of the battery system;

FIG. 5 is a schematic configuration diagram for a second modification example of the battery system;

FIG. 6 is a drawing showing the ON/OFF states of the relay devices depending on the behaviors of the vehicle according to the second modification example;

DETAILED DESCRIPTION OF EMBODIMENTS

Figure 3:
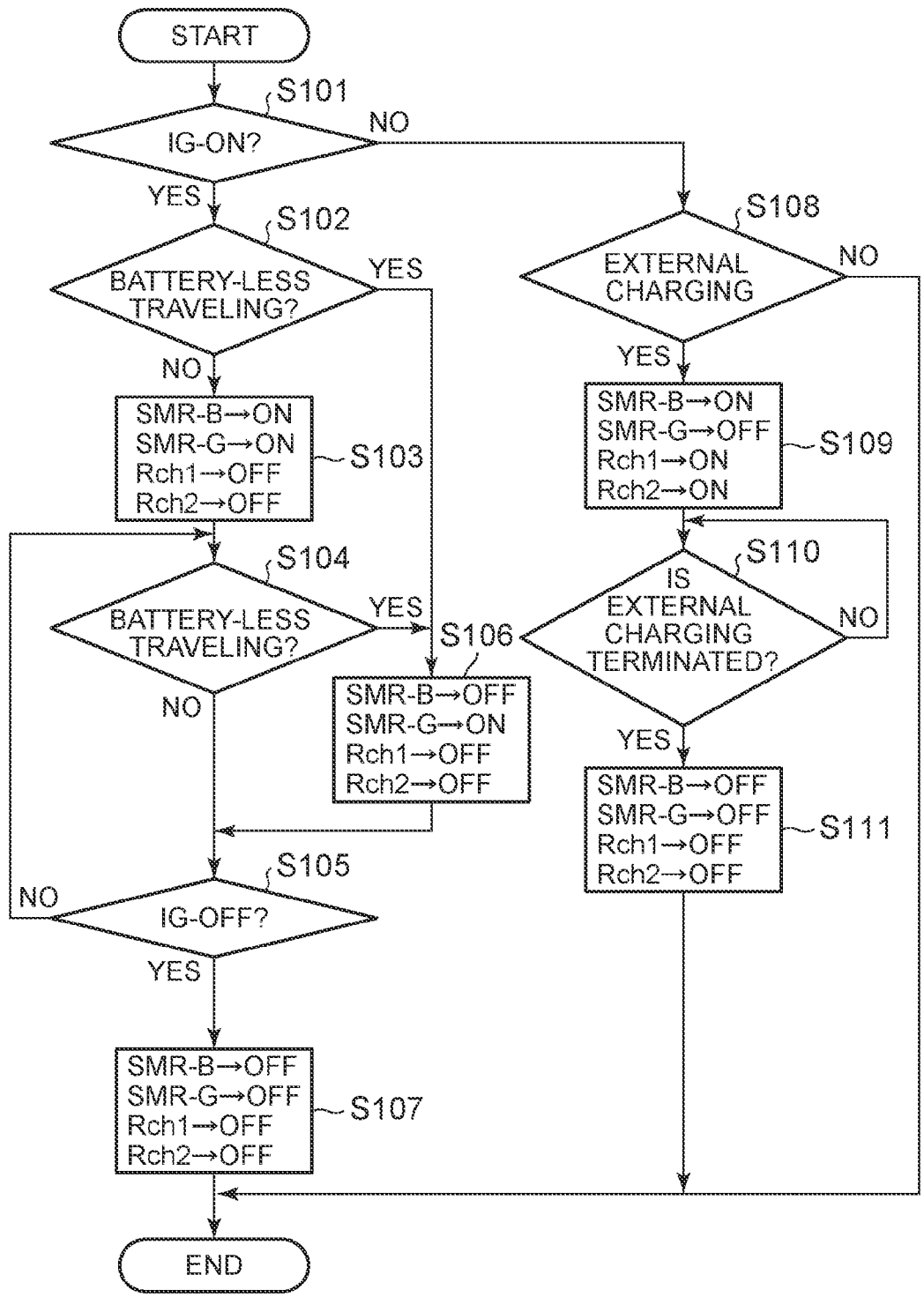
FIG. 3 is a flowchart illustrating a control flow regarding the relay devices depending on the behaviors of the vehicle according to Embodiment 1.

Hereinafter, embodiments of the invention will be described.

Embodiment 1

A battery system according to Embodiment 1 of the invention (corresponding to an electric power storage system of the invention) will be described with reference to FIGS. 1 to 7. FIG. 1 is a schematic diagram illustrating a configuration of the battery system according to this embodiment.

A positive electrode line PL is connected to a positive electrode terminal of a battery (corresponding to an electric power storage device of the invention) 10. A negative electrode line NL is connected to a negative electrode terminal of the battery 10. The positive electrode line PL and the negative electrode line NL constitute a first connection line and a second connection line of positive and negative electrodes that connect the battery 10 according to the invention to a load (such as an inverter 25 and a motor generator MG2 (described later)). The battery 10 has a plurality of electric cells. The number of the electric cells can be appropriately set. The plurality of electric cells that constitute the battery 10 can be connected in series or in parallel to each other.

One electric cell can be used instead of the battery 10. A secondary battery such as a nickel-hydrogen battery and a lithium-ion battery can be used as the electric cell. In addition, an electric double layer capacitor can be used instead of the secondary battery.

The battery 10 is connected to a boosting circuit 24 (corresponding to a converter of the invention) via the positive electrode line PL and the negative electrode line NL. The boosting circuit 24 is connected to the inverter 25. The inverter 25 converts DC electric power that is output from the battery 10 to AC electric power and outputs the AC electric power to the motor generator MG2. The motor generator (corresponding to a traveling motor of the invention) MG2 generates kinetic energy (power) for traveling of the vehicle by receiving the AC electric power that is output from the inverter 25.

The motor generator MG2 is connected to a drive shaft that is connected to drive wheels 26 via a transmission TM. Power of the motor generator MG2 is transmitted to the drive shaft via the transmission TM and is transmitted to the drive wheels 26 by the drive shaft. When the power that is generated by the motor generator MG2 is transmitted to the drive wheels 26 via the transmission TM, the vehicle can travel by using the electric power of the battery 10.

A power split mechanism 27 transmits power of an engine 28 to the drive wheels 26 or a motor generator MG1. The motor generator MG1 is a generator that generates electric power by receiving the power of the engine 28. The electric power that is generated by the motor generator MG1 (AC electric power) is supplied to the motor generator MG2 via the inverter 25 or is supplied to the battery 10 and an auxiliary machine battery 42 via the boosting circuit 24. When the electric power that is generated by the motor generator MG1 is supplied to the motor generator MG2, the drive wheels 26 can be driven by the kinetic energy generated by the motor generator MG2. When the electric power that is generated by the motor generator MG1 is supplied to the battery 10, the battery 10 can be charged. The same applies to the auxiliary machine battery 42 as well.

When the vehicle is decelerated or stopped, the motor generator MG2 converts kinetic energy that is generated during braking of the vehicle to electrical energy (AC electric power). The inverter 25 converts the AC electric power that is generated by the motor generator MG2 to DC electric power and outputs the DC electric power to the battery 10. Then, the battery 10 can store regenerative electric power.

The boosting circuit 24 is a voltage converter that boosts an output voltage of the battery 10 and outputs electric power after the boosting to the inverter 25 or steps down an output voltage of the inverter 25 and outputs electric power after the step-down to the battery 10.

The engine 28 is a known internal combustion engine, such as a gasoline engine and a diesel engine, that outputs power based on fuel combustion. The engine 28 can be started by the motor generator MG1 being used as an engine starting motor (starter). The engine 28 can be configured to be started when predetermined electric power is supplied from the battery 10 to the motor generator MG1 and the motor generator MG1 rotates a drive shaft of the engine 28 via the power split mechanism 27.

A DC/DC converter 40 steps down the output voltage of the battery 10 and output voltages of the motor generators MG1, MG2 and outputs electric power after the step-down to an auxiliary machine 41 and the auxiliary machine battery 42. The DC/DC converter 40 according to this embodiment is disposed on a current path between the battery 10 and the boosting circuit 24. Specifically, one end of the DC/DC converter 40 is connected to the positive electrode line PL between a system main relay SMR-B and the boosting circuit 24, and the other end of the DC/DC converter 40 is connected to the negative electrode line NL between the battery 10 and a system main relay SMR-G.

The auxiliary machine 41 refers to electric power-consuming equipment such as an air conditioning device (inverter, motor, and the like of an air conditioner) for a passenger compartment of the vehicle in which the battery system is mounted, AV equipment, a lighting device in the passenger compartment, and a head light. The auxiliary machine battery 42 is an electric power source device that supplies electric power to the auxiliary machine 41. The air conditioning device for the passenger compartment can be configured to be directly operated by electric power that is supplied via the boosting circuit 24 from the battery 10.

The battery system according to this embodiment is configured to include a charger 50 as well. The charger 50 charges the battery 10 with external electric power from an external electric power source 53. The charger 50 is connected to the battery 10 via charging lines PL1, NL1. The charging line PL1 is connected to the positive electrode line PL between the positive electrode terminal of the battery 10 and the system main relay SMR-B. The charging line NL1 is connected to the negative electrode line NL between the negative electrode terminal of the battery 10 and the system main relay SMR-G that is the negative electrode line NL between the negative electrode terminal of the battery 10 and the DC/DC converter 40 (further on the battery 10 side than a contact point of the DC/DC converter 40 and the negative electrode line NL).

Charging relays Rch1, Rch2 are disposed on the charging lines PL1, NL1, respectively. The battery 10 and the charger 50 (external electric power source 53) are electrically connected to each other when the charging relays Rch1, Rch2 and the system main relay SMR-B are ON and the system main relay SMR-G is OFF.

The charger 50 according to this embodiment is disposed on a current path that is capable of charging the battery 10 with the external electric power even when the system main relay SMR-B is in an ON state and the system main relay SMR-G is in an OFF state. In addition, the charger 50 is configured to ensure a current path leading from the charger 50 to the auxiliary machine battery 42 via the DC/DC converter 40 even when the system main relay SMR-G is controlled to be in the OFF state and the connection between the battery 10 and the boosting circuit 24 is in a cut-off state, that is, even when the battery 10 and the boosting circuit 24 are not connected to each other.

The charger 50 is connected to an inlet 51 that is disposed on the exterior of the vehicle. A charging plug 52 is connected to the inlet 51. The charging plug 52 is a connecting connector that is disposed on a charging cable which extends from the external electric power source 53. When the charging plug 52 is connected to the inlet 51, the external electric power of the external electric power source 53 can be supplied to the battery 10 via the charger 50. Then, the battery 10 can be charged by the external electric power source 53. When the external electric power source 53 supplies AC electric power, the charger 50, which can be provided with an AC/DC converter, converts the AC electric power from the external electric power source 53 to DC electric power or boosts the AC electric power from the external electric power source 53 to supply the DC electric power to the battery 10. The charging of the battery 10 based on the supply of the electric power of the external electric power source 53 to the battery 10 is referred to as external charging. Examples of the external electric power source 53 include a commercial electric power supply.

In this embodiment, the external charging is performed by the charging plug 52 being connected to the inlet 51. However, the invention is not limited thereto. Specifically, the electric power of the external electric power source 53 can be supplied to the battery 10 with a so-called non-contact charging system. The non-contact charging system uses electromagnetic induction and a resonance phenomenon, and can supply the electric power not via a cable. A known configuration can be appropriately adopted as the non-contact charging system.

A voltage sensor 20 detects an inter-terminal voltage value VB of the battery 10 and outputs a result of the detection to a controller 60. In addition, the voltage sensor 20 can detect a voltage value of each of the electric cells that constitute the battery 10. A current sensor 21 detects a current value IB of the battery 10 on a current path between the positive electrode terminal of the battery 10 and the system main relay SMR-B and outputs a result of the detection to the controller 60.

According to FIG. 1, a capacitor C is connected to the positive electrode line PL and the negative electrode line NL. The capacitor C is used for voltage smoothing between the positive electrode line PL and the negative electrode line NL. A voltage sensor 22 detects a voltage value VL of the capacitor C and outputs a result of the detection to the controller 60.

A current sensor 23 is disposed on a current path between the system main relay SMR-B and the boosting circuit 24. The current sensor 23 detects each current value IL of a current that is output from the battery 10 to the boosting circuit 24 and a current that is output from the boosting circuit 24 to the battery 10. The current sensor 23 outputs results of the detection to the controller 60.

A voltage sensor 43 detects an inter-terminal voltage VB_a of the auxiliary machine battery 42 and outputs a result of the detection to the controller 60. A current sensor 44 detects a current value IB_a output from the DC/DC converter 40 and outputs a result of the detection to the controller 60.

The controller 60 calculates a state of charge (SOC) and a full charge capacity of the battery 10 based on detected values from the voltage sensor 20, the current sensor 21, and a temperature sensor (not illustrated), manages the state of the battery 10, and transmits information on the management to a vehicle control device 80. The controller 60 has a memory 60a. The memory 60a stores information required for processings described in this embodiment. The memory 60a may be externally provided with respect to the controller 60.

The controller 60 controls ON/OFF of the system main relays SMR-B, SMR-G and the charging relays Rch1, Rch2. Each of the relay devices is switched between ON and OFF by a control signal from the controller 60 being received. In addition, the controller 60 can control respective operations of the boosting circuit 24, the inverter 25, the motor generators MG1, MG2, the DC/DC converter 40, and the charger 50 and perform a charging and discharging control and an external charging control for the battery system as a whole.

An engine control device 70 controls the engine 28 based on an engine control signal from the vehicle control device 80. The engine control device 70 controls a fuel injection quantity, an intake air quantity, an ignition timing, and the like of the engine 28 based on values detected by various sensors such as a rotation speed sensor so that the engine 28 is operated at a target rotation speed and a target torque determined by the vehicle control device 80.

The vehicle control device 80 is a main controller that controls the entire vehicle. The vehicle control device 80 performs an output control regarding the engine 28 and an input and output control regarding the battery 10 in accordance with a required output of the vehicle that is required for the vehicle as a whole. The vehicle control device 80 selects a vehicle power source in accordance with an operation state and performs a traveling control for the vehicle using a driving force from one or each of the engine 28 and the motor generator MG2. The controller 60, the engine control device 70, and the vehicle control device 80 may be configured as a single control device. In addition, for example, individual controlling controllers in the controller 60 may be configured to be responsible for the relay device ON/OFF control, the charging and discharging control, and the external charging control, respectively.

FIG. 2 is a drawing showing the ON/OFF states of the relay devices depending on behaviors of the vehicle according to this embodiment. When an ignition switch of the vehicle is turned ON (IG-ON), the controller 60 controls the system main relays SMR-B, SMR-G to be switched from OFF to ON and connects the battery 10 and the boosting circuit 24 (inverter 25) to each other so that the battery system is started (Ready-On). When the ignition switch of the vehicle is turned OFF (IG-OFF) with the battery system started, the controller 60 controls the system main relays SMR-B, SMR-G to be switched from ON to OFF, blocks the connection between the battery 10 and the boosting circuit 24 (inverter 25), and puts the battery system into a non-starting state (Ready-off). During the control of the ON/OFF of the system main relays SMR-B, SMR-G resulting from the ignition switch ON/OFF, the charging relays Rch1, Rch2 are controlled to remain OFF at all times. An ignition switch ON/OFF signal is input to the controller 60 via the vehicle control device 80 or directly.

A relay device and a resistor element that are connected in series to each other can be connected in parallel to either one of the system main relay SMR-B and the system main relay SMR-G. An inrush current during the start of the battery system can be suppressed by ON/OFF of a relay device to which the system main relays SMR-B, SMR-G and the resistor element are connected in series being controlled.

During the external charging, the controller 60 controls the system main relay SMR-B to be turned ON and controls the system main relay SMR-G to be turned OFF. Then, the battery 10 and the boosting circuit 24 are put into the cut-off state. Then, the controller 60 controls both of the charging relays Rch1, Rch2 to be turned ON and connects the charger 50 and the battery 10 to each other.

In this case, the other end of the DC/DC converter 40 is connected to the negative electrode line NL between the battery 10 and the system main relay SMR-G as illustrated in FIG. 1. Accordingly, the battery 10 can be charged by the current path through which no charging current flows to the boosting circuit 24 even when the system main relay SMR-G is in the OFF state because the system main relay SMR-B is in the ON state, and the charging of the auxiliary machine battery 42 can be performed even without the connection to the boosting circuit 24 by the DC/DC converter 40 being operated during the external charging.

Accordingly, the external electric power (external charging current) does not flow through the boosting circuit 24 during the external charging, and thus a reduction in durability of the boosting circuit 24 can be suppressed. In addition, the single DC/DC converter 40 is shared for both an output to the auxiliary machine battery 42 from the current path between the battery 10 and the boosting circuit 24 and an output to the auxiliary machine battery 42 during the external charging, and thus the number of components can be reduced and an increase in a physique (size) of the battery system as a whole can be suppressed.

In the case of an abnormality of the battery 10, the system main relays SMR-B, SMR-G can be controlled to be turned OFF and the electrical connection between the battery 10 and the boosting circuit 24 can be blocked in view of battery protection and circuit protection for the battery system. In this case, the traveling of the vehicle can be allowed based on a switching to a traveling of the vehicle using only the engine 28 as a power source (battery-less traveling).

During the battery-less traveling, the engine 28 is used as the sole power source, and thus the current path between the battery 10 and the boosting circuit 24 may be basically blocked. In this case, however, the regenerative electric power of the motor generator MG2 and the electric power that is generated by the motor generator MG1 need to be supplied to the auxiliary machine 41 via the DC/DC converter 40 or the auxiliary machine battery 42 needs to be charged with the regenerative electric power of the motor generator MG2 and the electric power that is generated by the motor generator MG1. Accordingly, simply blocking the electrical connection between the battery 10 and the boosting circuit 24 causes the current path between the boosting circuit 24 and the DC/DC converter 40 to be blocked, and then the electric power that is generated by the motor generator MG1 during the battery-less traveling cannot be supplied to the DC/DC converter 40 in some cases.

In this embodiment, only the system main relay SMR-B is controlled to be put into the OFF state in the case of a battery abnormality, and thus the electrical connection between the boosting circuit 24 and the DC/DC converter 40 can be maintained while the electrical connection between the battery 10 and the boosting circuit 24 is blocked. This is because the one end of the DC/DC converter 40 is connected to the positive electrode line PL between the system main relay SMR-B and the boosting circuit 24 and the other end of the DC/DC converter 40 is connected to the negative electrode line NL between the battery 10 and a system main relay SMR-G as described above.

This configuration allows the regenerative electric power of the motor generator MG2 and the electric power that is generated by the motor generator MG1 to be supplied to the auxiliary machine 41 and/or the auxiliary machine battery 42 by the DC/DC converter 40 being operated while the electrical connection to the battery 10 is blocked even in the case of the switching to the traveling of the vehicle during which the engine 28 is the sole power source. Accordingly, an electric power source for the auxiliary machine during the battery-less traveling can be ensured or a place for regenerative electric power charging can be ensured.

According to the battery system of this embodiment, the single DC/DC converter 40 allows electric power to be supplied to the auxiliary machine battery 42 while preventing the external electric power from flowing through the boosting circuit 24 during the external charging and allows the electric power that is generated by the motor generator MG1 to be supplied to the auxiliary machine 41 or the auxiliary machine battery 42 via the DC/DC converter 40 even during the battery-less traveling. Since the single DC/DC converter 40 can be shared, the number of components can be reduced and the reduction in the durability of the boosting circuit 24 can be suppressed.

FIG. 3 is a flowchart illustrating a control flow regarding the respective relay devices depending on the behaviors of the vehicle, which is performed by the controller 60.

As illustrated in FIG. 3, the controller 60 determines whether or not to perform the battery-less traveling when the ignition switch of the vehicle is turned ON (IG-ON) (YES in S101). For example, the controller 60 can perform a predetermined battery abnormality detection processing based on a state of deterioration of the voltage value VB of the battery 10. A result of the battery abnormality detection is stored in the memory 60a. In Step S102, the controller 60 refers to the result of the battery abnormality detection stored in the memory 60a, and determines to perform the battery-less traveling and prohibits the start of the battery system in a case where it is determined that the battery is abnormal. In a case where it is determined that the battery is normal, the controller 60 does not perform the battery-less traveling and allows the battery system to be started.

When the battery system is allowed to be started in Step S102, the controller 60 controls the system main relays SMR-B, SMR-G to be switched from OFF to ON, connects the battery 10 and the boosting circuit 24 (inverter 25) to each other, and starts the battery system (Ready-On). In this case, the charging relays Rch1, Rch2 are controlled to be OFF (S103).

The controller 60 can perform the above-described abnormality detection processing for the battery 10 even after the battery system is started. In this case, the controller 60 determines whether or not to perform the battery-less traveling (S104) as in Step S102. In a case where it is determined in Step S104 that the battery is normal, the controller 60 maintains the state where the battery 10 and the boosting circuit 24 are connected to each other and performs the charging and discharging control for the battery 10.

In a case where the controller 60 determines to perform the battery-less traveling in Steps S102 and S104, the processing proceeds to Step S106 and an ON/OFF control for the relay device for the battery-less traveling is performed. Specifically, in a case where the controller 60 determines in Step S102 to perform the battery-less traveling, the controller 60 blocks the current path between the battery 10 and the boosting circuit 24 by controlling only the system main relay SMR-G to be turned ON with the system main relay SMR-B remaining OFF and ensures the current path between the boosting circuit 24 and the DC/DC converter 40. In a case where the controller 60 determines in Step S104 to perform the battery-less traveling, the controller 60 controls the system main relay SMR-G to be turned ON while controlling the system main relay SMR-B to be switched from ON to OFF.

When the ignition switch of the vehicle is turned OFF (S105), the controller 60 controls both of the system main relays SMR-B, SMR-G to be turned OFF. Even in this case, the charging relays Rch1, Rch2 are controlled to be OFF (S107).

In the example of FIG. 3, the controller 60 allows the processing to proceed to Step S108 when the ignition switch of the vehicle is not ON (NO in S101). In Step S108, the controller 60 determines whether or not to perform the external charging. This determination of whether or not to perform the external charging can be performed based on, for example, a determination of whether or not the charging plug 52 is connected to the inlet 51 or a determination of whether or not a timer charging initiation time has been reached in a state where the charging plug 52 is connected to the inlet 51.

The controller 60 terminates this processing in a case where the controller 60 determines in Step S108 not to perform the external charging (NO in S108). In a case where the controller 60 determines to perform the external charging (YES in S108), the controller 60 controls the charging relays Rch1, Rch2 to be switched from OFF to ON, controls the system main relay SMR-B from OFF to ON, and controls the system main relay SMR-G to remain OFF (S109).

In a case where it is determined in Step S110 that the external charging is terminated, the controller 60 controls all of the system main relays SMR-B, SMR-G and the charging relays Rch1, Rch2 to be turned OFF (5111). Whether the external charging is terminated or not can be determined based on, for example, a determination of whether or not the SOC of the battery 10 has reached a predetermined upper limit value or a determination of whether or not a timer charging termination time has been reached.

During the external charging, the controller 60 can perform a control for charging the auxiliary machine battery 42 with the external electric power that is output from the charger 50 by operating the DC/DC converter 40. In addition, the controller 60 can charge the auxiliary machine battery 42 with the electric power that is accumulated in the battery 10 via the DC/DC converter 40. In this case, the battery 10 can be temporarily charged with the external electric power that is output from the charger 50, and then the auxiliary machine battery 42 can be charged with the electric power with which the battery 10 is charged by the DC/DC converter 40 being operated at a predetermined timing during the external charging.

FIG. 4 is a schematic configuration diagram illustrating a first modification example of the battery system according to this embodiment. The first modification example that is illustrated in FIG. 4 is opposite to the configuration of the battery system illustrated in FIG. 1 when it comes to the positions of connection between the DC/DC converter 40 and the system main relays SMR-B, SMR-G.

Specifically, the DC/DC converter 40 according to the first modification example is disposed on the current path between the battery 10 and the boosting circuit 24, and the one end of the DC/DC converter 40 is connected to the negative electrode line NL between the system main relay SMR-G and the boosting circuit 24 while the other end of the DC/DC converter 40 is connected to the positive electrode line PL between the battery 10 and the system main relay SMR-B. The charging line PL1 is connected to the positive electrode line PL between the positive electrode terminal of the battery 10 and the system main relay SMR-B that is the positive electrode line PL between the positive electrode terminal of the battery 10 and the DC/DC converter 40 (further on the battery 10 side than a contact point of the DC/DC converter 40 and the positive electrode line PL). The charging line NL1 is connected to the negative electrode line NL between the negative electrode terminal of the battery 10 and the system main relay SMR-G.

Even in the case of the first embodiment that is illustrated in FIG. 4, the one end of the DC/DC converter 40 is connected to the positive electrode line PL between the battery 10 and the system main relay SMR-B as in the case of the battery system illustrated in FIG. 1. Accordingly, the system main relay SMR-G is in the ON state even when the system main relay SMR-B is in the OFF state, and thus the battery 10 can be charged by the current path through which no charging current flows to the boosting circuit 24, and the current path leading to the auxiliary machine battery 42 via the DC/DC converter 40 is ensured even without a connection to the boosting circuit 24. The ON/OFF of the system main relays SMR-B, SMR-G is reversed in a case where the first modification example illustrated in FIG. 4 is applied to the ON/OFF control for the relay devices illustrated in FIG. 3.

FIG. 5 is a schematic configuration diagram illustrating a second modification example of the battery system according to this embodiment. The second modification example that is illustrated in FIG. 5 differs from the battery system illustrated in FIG. 1 in that the system main relay SMR-B and the charging relay Rch1 are configured as one common relay device SMR-C.

As illustrated in FIG. 5, the relay device SMR-C that corresponds to the system main relay SMR-B is disposed on the positive electrode line PL. The one end of the DC/DC converter 40 is connected to the positive electrode line PL between the relay device SMR-C and the boosting circuit 24. The other end of the DC/DC converter 40 is connected to the negative electrode line NL between the negative electrode terminal of the battery 10 and the system main relay SMR-G as in the case of FIG. 1.

The charging line PL1 connected to the charger 50 is connected to the positive electrode line PL between the relay device SMR-C and the DC/DC converter 40. In this case, no relay device (charging relay Rch1) is disposed on the charging line PL1. As in the case of FIG. 1, the charging line NL1 is connected to the negative electrode line NL between the battery 10 and the system main relay SMR-G and further on the battery 10 side than a contact point for the other end of the DC/DC converter 40.

FIG. 6 is a drawing showing the ON/OFF states of the respective relay devices depending on the behaviors of the vehicle according to the second modification example. As illustrated in FIG. 6, the controller 60 controls the relay device SMR-C and the system main relay SMR-G from OFF to ON and starts the battery system when the ignition switch of the vehicle is turned ON. When the ignition switch of the vehicle is turned OFF, the controller 60 controls the relay device SMR-C and the system main relay SMR-G from ON to OFF and puts the battery system into the non-starting state. During the control of the ON/OFF of the relay device SMR-C and the system main relay SMR-G resulting from the ignition switch ON/OFF, the charging relay Rch2 is controlled to remain OFF at all times.

During the external charging, the controller 60 controls the relay device SMR-C to be turned ON and controls the system main relay SMR-G to be turned OFF. Then, the battery 10 and the boosting circuit 24 are put into the cut-off state. Then, the controller 60 controls the charging relay Rch2 from OFF to ON and connects the charger 50 and the battery 10 to each other.

Even in this case, the other end of the DC/DC converter 40 is connected to the negative electrode line NL between the battery 10 and the system main relay SMR-G as illustrated in FIG. 5. Accordingly, the relay device SMR-C is in the ON state even when the system main relay SMR-G is in the OFF state, and thus the battery 10 can be charged by the current path through which no charging current flows to the boosting circuit 24, and the current path leading to the auxiliary machine battery 42 via the DC/DC converter 40 is ensured even without a connection to the boosting circuit 24.

In the event of the traveling of the vehicle during which the engine 28 is the sole power source (battery-less traveling) with the electrical connection between the battery 10 and the boosting circuit 24 blocked, the controller 60 controls the system main relay SMR-G from OFF to ON (or maintains the ON state of the system main relay SMR-G) while controlling the relay device SMR-C to be turned OFF. Since only the relay device SMR-C is controlled to be in the OFF state, the electrical connection between the boosting circuit 24 and the DC/DC converter 40 can be maintained while the electrical connection between the battery 10 and the boosting circuit 24 is blocked.

Figure 7:
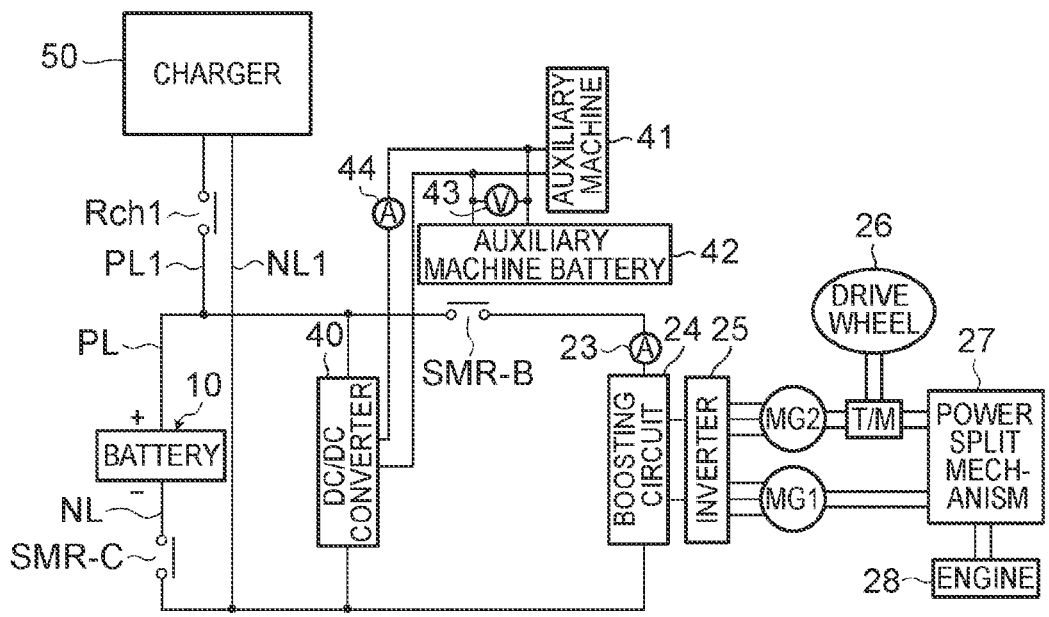
FIG. 7 is a schematic configuration diagram for a third modification example of the battery system.

FIG. 7 is a schematic configuration diagram illustrating a third modification example of the battery system according to this embodiment. The third modification example that is illustrated in FIG. 7 differs from the battery system according to the second modification example illustrated in FIG. 5 in that the system main relay SMR-G and the charging relay Rch2 are configured as one common relay device SMR-C.

As illustrated in FIG. 7, the relay device SMR-C that corresponds to the system main relay SMR-G is disposed on the negative electrode line NL. The one end of the DC/DC converter 40 is connected to the positive electrode line PL between the positive electrode terminal of the battery 10 and the system main relay SMR-B. The other end of the DC/DC converter 40 is connected to the negative electrode line NL between the relay device SMR-C and the boosting circuit 24.

The charging line PL1 connected to the charger 50 is connected to the positive electrode line PL between the battery 10 and the system main relay SMR-B and further on the battery 10 side than a contact point for the one end of the DC/DC converter 40. The charging line NL1 is connected to the negative electrode line NL between the relay device SMR-C and a contact point for the DC/DC converter 40. In this case, no relay device (charging relay Rch2) is disposed on the charging line NL1.

In the third modification example, the ON/OFF states of the respective relay devices depending on the behaviors of the vehicle that are illustrated in FIG. 6 are similar to the control of the ON/OFF of the relay device SMR-C and the system main relay SMR-B resulting from the ON/OFF of the ignition switch. During the external charging, the controller 60 controls the relay device SMR-C to be ON and controls the system main relay SMR-B to be OFF. When the battery-less traveling is performed, the controller 60 controls the system main relay SMR-B from OFF to ON (or maintains the ON state of the system main relay SMR-B) while controlling the relay device SMR-C to be turned OFF.

The second modification example and the third modification example can achieve effects similar to effects achieved by the above-described battery system illustrated in FIG. 1 and the like. In addition, in the second modification example and the third modification example, one of the system main relays SMR-B, SMR-G connecting or blocking the current path between the battery 10 and the boosting circuit 24 and one of the charging line PL1 connected to the charger 50, the charging relay Rch1 disposed on the charging line NL1, and the charging relay Rch2 are configured as the one common relay device SMR-C. Accordingly, the number of the relay devices can be reduced and the number of components can be reduced.

Embodiment 2

Embodiment 2 of the invention will be described with reference to FIGS. 8 to 11. In this embodiment, a method for determining (detecting) ON failures of the system main relays SMR-B, SMR-G of the above-described battery system will be described.

The system main relays SMR-B, SMR-G have a movable contact point and a fixed contact point. The movable contact point might be fixed to the fixed contact point. In the event of this fixing, the system main relays SMR-B, SMR-G remain ON. In this regard, it is required to determine the occurrence or non-occurrence of the fixing of the relay device.

Figure 8:
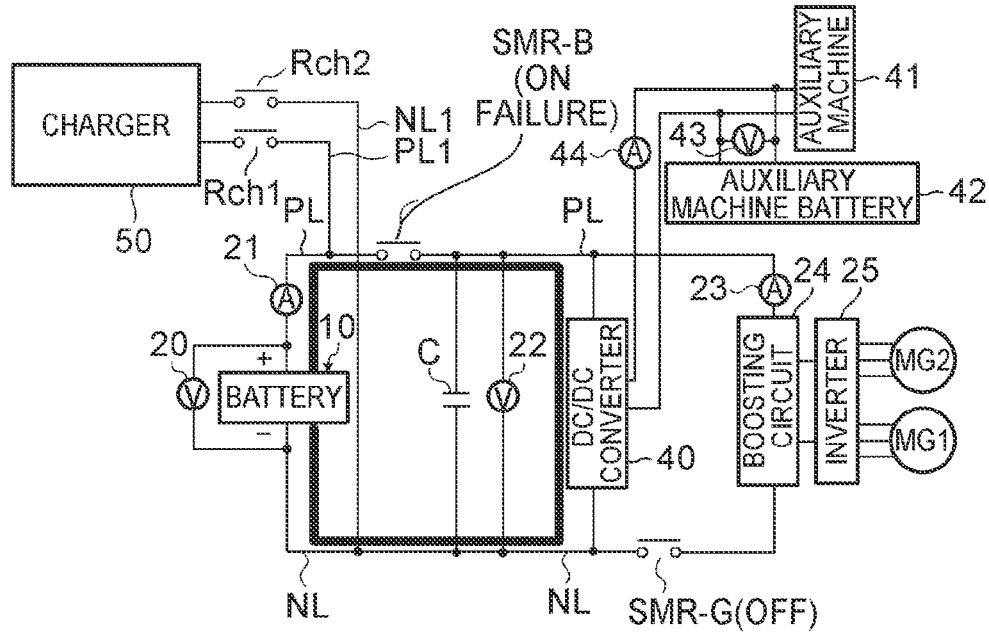
FIG. 8 is a drawing for showing a current path during an ON failure of the relay device (SMR-B) and a method for determining the ON failure of the relay device according to Embodiment 2.

FIG. 8 is a drawing for showing a current path during the ON failure of the system main relay SMR-B and a method for determining the ON failure of the system main relay SMR-B according to this embodiment. The ON failure detection method according to this embodiment will be described with the circuit configuration of the battery system according to Embodiment 1 that is illustrated in FIG. 1 used as an example.

As illustrated in FIG. 8, the current path that energizes the battery 10 and the DC/DC converter 40 is formed when the system main relay SMR-B is fixed and the ON failure occurs. Accordingly, the ON failure of the system main relay SMR-B can be determined by the DC/DC converter 40 being operated in a state where both the system main relays SMR-B, SMR-G are controlled to be OFF.

When the system main relay SMR-B is subjected to no ON failure even when the DC/DC converter 40 is operated in a state where both the system main relays SMR-B, SMR-G are controlled to be OFF, the current path between the battery 10 and the DC/DC converter 40 is not blocked and the current value IB of the battery 10 and the current value IB_a output from the DC/DC converter 40 are subjected to no change.

Accordingly, it can be determined that the system main relay SMR-B is subjected to the ON failure in a case where the current value IB of the battery 10 and the current value IB_a output from the DC/DC converter 40 change when the DC/DC converter 40 is operated in a state where both the system main relays SMR-B, SMR-G are controlled to be OFF. The ON failure of the system main relay SMR-B can also be determined based on monitoring of, for example, changes in the voltage value VB of the battery 10 and the voltage value VB_a of the auxiliary machine battery 42 before and after the operation of the DC/DC converter 40 as well as the current values IB, IB_a.

Figure 9:
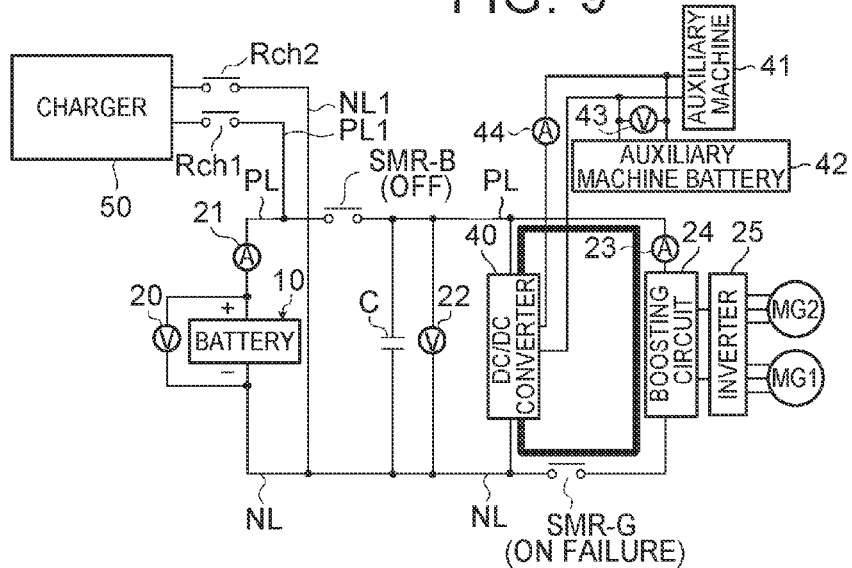
FIG. 9 is a drawing for showing a current path during an ON failure of the relay device (SMR-G) and a method for determining the ON failure of the relay device according to Embodiment 2.

FIG. 9 is a drawing for showing a current path during the ON failure of the system main relay SMR-G and a method for determining the ON failure of the system main relay SMR-G according to this embodiment. As illustrated in FIG. 9, the current path that energizes the DC/DC converter 40 and the boosting circuit 24 is formed when the system main relay SMR-G is fixed and the ON failure occurs. Accordingly, the ON failure of the system main relay SMR-G can be determined by the engine 28 being operated in a state where both the system main relays SMR-B, SMR-G are controlled to be OFF and the DC/DC converter 40 being operated during an electric power-generating operation by the motor generator MG1.

When the system main relay SMR-G is subjected to no ON failure even when the DC/DC converter 40 is operated in a state where both the system main relays SMR-B, SMR-G are controlled to be OFF, the current path between the DC/DC converter 40 and the boosting circuit 24 is not blocked and the current value IL of the boosting circuit 24 and the current value IB_a output from the DC/DC converter 40 are subjected to no change without the electric power generated by the motor generator MG1 flowing through the DC/DC converter 40.

Accordingly, the DC/DC converter 40 is operated during the electric power-generating operation by the motor generator MG1 by the engine 28 being operated in a state where both the system main relays SMR-B, SMR-G are controlled to be OFF. Then, it can be determined that the system main relay SMR-G is subjected to the ON failure in a case where the current value IL and the current value IB_a change during the operation of the DC/DC converter 40. The ON failure of the system main relay SMR-G can also be determined based on monitoring of, for example, a change in the voltage value VB_a of the auxiliary machine battery 42 before and after the operation of the DC/DC converter 40 as well as the current values IL, IB_a.

The DC/DC converter 40 can be provided with a boosting function in addition to the step-down function described above. In this case, electric power can be output from, for example, the auxiliary machine battery 42 to the boosting circuit 24, and thus it can be determined that the system main relay SMR-G is subjected to the ON failure based on monitoring of a change in the current value IL flowing through the boosting circuit 24, the voltage value VL of the smoothing capacitor C, and a change in a voltage value of a smoothing capacitor (not illustrated) disposed in the inverter 25 or the like.

Figure 10:
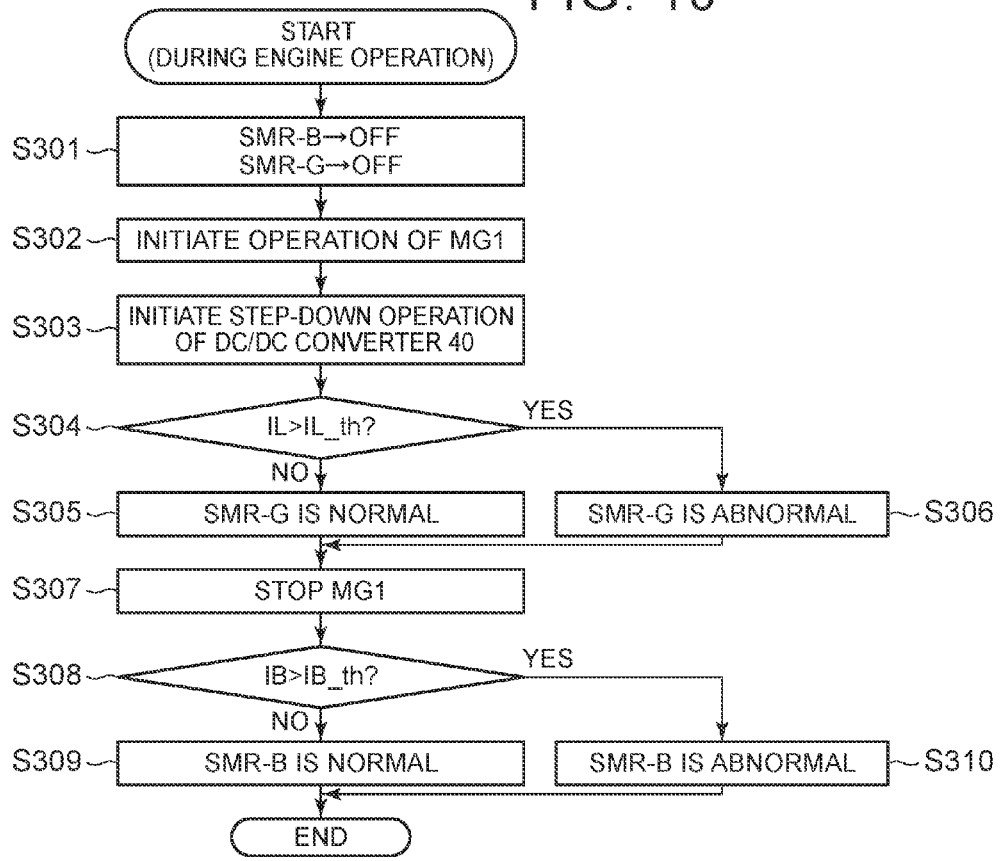
FIG. 10 is a flowchart illustrating a processing for determining the ON failure of the relay device according to Embodiment 2.

FIG. 10 is a flowchart illustrating a processing for determining the ON failure of the relay device according to this embodiment. The example that is illustrated in FIG. 10 is the ON failure determination processing for the system main relays SMR-B, SMR-G that is performed by the engine 28 being operated and while the motor generator MG1 performs the electric power-generating operation.

The controller 60 can perform the ON failure determination processing at any timing when the engine 28 is in the operating state. In addition, the controller 60 can start the stopped engine 28 via the vehicle control device 80 for the ON failure determination.

For example, the controller 60 controls both the system main relays SMR-B, SMR-G from ON to OFF at any timing when the engine 28 is started after the start of the battery system (S301).

After controlling both the system main relays SMR-B, SMR-G from ON to OFF, the controller 60 performs a control such that the motor generator MG1 generates electric power based on the power of the engine 28 and operates the DC/DC converter 40 (S302). Then, the controller 60 performs a control so that the electric power that is generated by the motor generator MG1 is stepped down and output to the auxiliary machine 41 or the auxiliary machine battery 42 (S303).

The controller 60 determines whether or not the current value IL detected by the current sensor 23 during the step-down operation of the DC/DC converter 40 exceeds a threshold IL_th (S304). The threshold IL_th is set based on a detection error of the current sensor 23.

In a case where it is determined that the current value IL detected by the current sensor 23 is equal to or less than the threshold IL_th (NO in S304), the controller 60 determines that the current path between the DC/DC converter 40 and the boosting circuit 24 is blocked, that is, the system main relay SMR-G is OFF. In this case, the controller 60 determines that the system main relay SMR-G is normal (subjected to no ON failure) (S305).

In a case where it is determined in Step S304 that the current value IL detected by the current sensor 23 exceeds the threshold IL_th (YES in S304), the controller 60 determines that the current path between the DC/DC converter 40 and the boosting circuit 24 is not blocked and the system main relay SMR-G is ON. In this case, the controller 60 determines that the system main relay SMR-G is abnormal (subjected to the ON failure) (S306). In Steps S305 and S306, an ON failure flag for the system main relay SMR-G is controlled to be ON or OFF. The ON failure flag is stored in the memory 60a.

Then, the controller 60 stops the electric power-generating operation of the motor generator MG1 (S307). In this case, the controller 60 controls the operation of the DC/DC converter 40 to continue and acquires the current value IB detected by the current sensor 21.

The controller 60 determines whether or not the current value IB detected by the current sensor 21 that pertains to the case where the electric power-generating operation of the motor generator MG1 is stopped and the DC/DC converter 40 is in operation exceeds a threshold IB_th (S308). The threshold IB_th is set based on a detection error of the current sensor 21.

In a case where it is determined that the current value IB detected by the current sensor 21 is equal to or less than the threshold IB_th (NO in S308), the controller 60 determines that the current path between the battery 10 and the DC/DC converter 40 is blocked, that is, the system main relay SMR-B is OFF. In this case, the controller 60 determines that the system main relay SMR-B is normal (subjected to no ON failure) (S309).

In a case where it is determined in Step S308 that the current value IB detected by the current sensor 21 exceeds the threshold IB_th (YES in S308), the controller 60 determines that the current path between the battery 10 and the DC/DC converter 40 is not blocked and the system main relay SMR-B is ON. In this case, the controller 60 determines that the system main relay SMR-B is abnormal (subjected to the ON failure) (S310). In Steps S309 and S310, an ON failure flag for the system main relay SMR-B is controlled to be ON or OFF. The ON failure flag is stored in the memory 60a.

In the ON failure determination processing according to the example of FIG. 10, the ON failure determinations for both the system main relays SMR-B, SMR-G are performed at the same time. However, the respective determination processings regarding the system main relays SMR-B, SMR-G may be individually performed as well. In other words, the ON failure determination targeting only the system main relay SMR-B and the ON failure determination targeting only the system main relay SMR-G can be individually applied. The same applies to the ON failure determination processing that is illustrated in FIG. 11 (described later).

Figure 11:
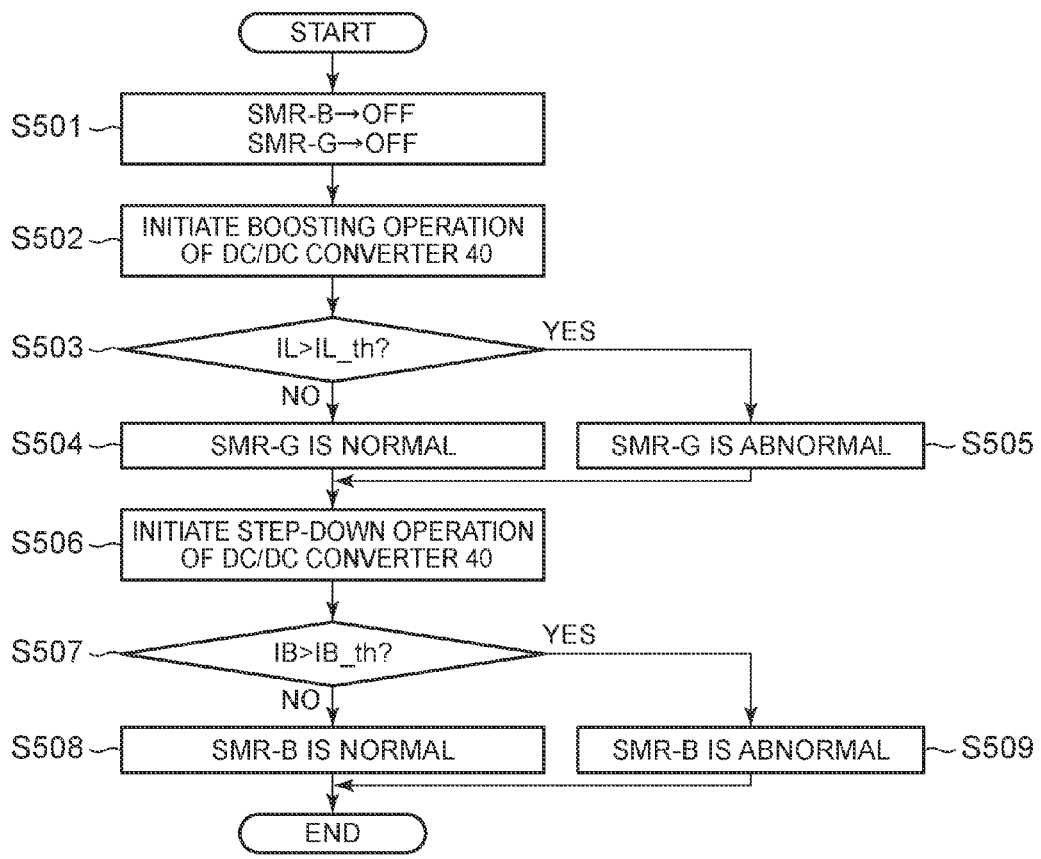
FIG. 11 is a flowchart illustrating the processing for determining the ON failure of the relay device according to Embodiment 2.

FIG. 11 is a flowchart illustrating the processing for determining the ON failure of the relay device according to this embodiment. The example that is illustrated in FIG. 11 is an ON failure determination processing for the system main relays SMR-B, SMR-G that is performed when the DC/DC converter 40 is configured as a bi-directional DC/DC converter that has the boosting function in addition to the step-down function. The processing that is illustrated in FIG. 11 is performed by the controller 60.

The controller 60 can perform the ON failure determination processing that is illustrated in FIG. 11 at any timing after the ignition switch is turned ON, after the ignition switch is turned OFF, or during the external charging.

The controller 60 controls both the system main relays SMR-B, SMR-G to be OFF (S501), and then allows the DC/DC converter 40 to initiate a boosting operation (S502). After the boosting operation of the DC/DC converter 40, the controller 60 determines whether or not the current value IL detected by the current sensor 23 exceeds the threshold IL_th (S503).

In a case where it is determined that the current value IL detected by the current sensor 23 is equal to or less than the threshold IL_th (NO in S503), the controller 60 determines that the current path between the DC/DC converter 40 and the boosting circuit 24 is blocked, that is, the system main relay SMR-G is OFF. In this case, the controller 60 determines that the system main relay SMR-G is normal (subjected to no ON failure) (S504).

In a case where it is determined in Step S503 that the current value IL detected by the current sensor 23 exceeds the threshold IL_th (YES in S503), the controller 60 determines that the current path between the DC/DC converter 40 and the boosting circuit 24 is not blocked and the system main relay SMR-G is ON. In this case, the controller 60 determines that the system main relay SMR-G is abnormal (subjected to the ON failure) (S505). In Steps S504 and S505, an ON failure flag for the system main relay SMR-G is controlled to be ON or OFF. The ON failure flag is stored in the memory 60a.

Then, the controller 60 stops the operation of the DC/DC converter 40 during the boosting operation and performs a control so that the step-down operation is performed (S506). The controller 60 acquires the current value IB detected by the current sensor 21 during the step-down operation of the DC/DC converter 40.

The controller 60 determines whether or not the current value IB detected by the current sensor 21 that pertains to the case where the DC/DC converter 40 is allowed to perform the step-down operation exceeds the threshold IB_th (S507). The threshold IB_th is set based on the detection error of the current sensor 21.

In a case where it is determined that the current value IB detected by the current sensor 21 is equal to or less than the threshold IB_th (NO in S507), the controller 60 determines that the current path between the battery 10 and the DC/DC converter 40 is blocked, that is, the system main relay SMR-B is OFF. In this case, the controller 60 determines that the system main relay SMR-B is normal (subjected to no ON failure) (S508).

In a case where it is determined in Step S507 that the current value IB detected by the current sensor 21 exceeds the threshold IB_th (YES in S507), the controller 60 determines that the current path between the battery 10 and the DC/DC converter 40 is not blocked and the system main relay SMR-B is ON. In this case, the controller 60 determines that the system main relay SMR-B is abnormal (subjected to the ON failure) (S509). In Steps S508 and S509, an ON failure flag for the system main relay SMR-B is controlled to be ON or OFF. The ON failure flag is stored in the memory 60a.

The embodiments of the invention have been described above. In this description, the hybrid vehicle that includes the motor generator MG2 (traveling motor) which is driven by the electric power supplied from the engine 28 and the battery 10 as the vehicle power source has been used as an example. However, the invention is not limited thereto. The battery system and the ON failure determination processing according to these embodiments can also be applied to an electric car in which the battery system (battery) is the only power source for traveling of the vehicle. In this case, the ON failure determination processing that is illustrated in FIG. 11 can be applied as the ON failure determination processing.

Each of the ON failure determination processings according to Embodiment 2 in FIGS. 10 and 11 can also be applied to each of the configurations of the battery systems according to Embodiment 1 illustrated in FIGS. 4, 5, and 7. In the battery system illustrated in FIG. 4, the ON failure determination processings for the system main relay SMR-B and the system main relay SMR-G are reversed. In the battery system illustrated in FIG. 5, the system main relay SMR-B is substituted with the common relay device SMR-C. In the battery system illustrated in FIG. 7, the system main relay SMR-B is substituted with the common relay device SMR-C and the ON failure determination processings for the relay device SMR-C corresponding to the system main relay SMR-B and the system main relay SMR-G are reversed.

What is claimed is:

1. An electric power storage system for a vehicle, the electric power storage system comprising:
    an electric power storage device configured to supply electric power to a traveling motor of the vehicle;
    a converter configured to perform voltage conversion between the electric power storage device and the traveling motor;
    a DC/DC converter disposed on a current path between the electric power storage device and the converter and configured to step down an output voltage from the current path to an auxiliary machine or an auxiliary machine battery mounted in the vehicle;
    a charger configured to charge the electric power storage device with external electric power supplied from an external electric power source;
    a first relay disposed on a first connection line as one of positive and negative electrodes connecting the electric power storage device to the converter; and
    a second relay disposed on a second connection line as the other one of the positive and negative electrodes connecting the electric power storage device to the converter,
    wherein one end of the DC/DC converter is connected to the first connection line between the first relay and the converter and the other end of the DC/DC converter is connected to the second connection line between the electric power storage device and the second relay, and wherein the charger is disposed on a current path capable of charging the electric power storage device with the external electric power when the first relay is in an ON state and the second relay is in an OFF state.

2. The electric power storage system according to claim 1, the vehicle being a hybrid vehicle provided with an engine as a driving source for traveling of the vehicle, the electric power storage system further comprising:

a generator connected to the converter and generating electric power by receiving power of the engine; and a controller configured to control charging and discharging of the electric power storage device, wherein the controller is configured to perform a control such that the electric power generated by the generator is supplied to the auxiliary machine or the auxiliary machine battery via the DC/DC converter while controlling the first relay to be OFF and the second relay to be ON during the traveling of the vehicle using the engine as the driving source with the electric power supply from the electric power storage device to the traveling motor blocked.

3. The electric power storage system according to claim 2 further comprising:

a third relay disposed on a first charging line as one of positive and negative electrodes connecting the electric power storage device to the charger; and a fourth relay disposed on a second charging line as the other one of the positive and negative electrodes connecting the electric power storage device to the charger, wherein the controller is configured to perform an external charging control for charging the electric power storage device with the external electric power, and wherein the controller is configured to connect the electric power storage device and the charger to each other by turning ON the third relay and the fourth relay and perform a control such that the external electric power is supplied to the auxiliary machine battery via the DC/DC converter while controlling the first relay to be ON and the second relay to be OFF.

4. The electric power storage system according to claim 1 further comprising:

a third relay disposed on a first charging line as one of positive and negative electrodes connecting the electric power storage device to the charger;

a fourth relay disposed on a second charging line as the other one of the positive and negative electrodes connecting the electric power storage device to the charger; and a controller configured to perform an external charging control for charging the electric power storage device with the external electric power, wherein the controller is configured to connect the electric power storage device and the charger to each other by turning ON the third relay and the fourth relay and perform a control such that the external electric power is supplied to the auxiliary machine battery via the DC/DC converter while controlling the first relay to be ON and the second relay to be OFF.

5. The electric power storage system according to claim 1 further comprising:

a first charging line as one of positive and negative electrodes connecting the electric power storage device to the charger;

a second charging line as the other one of the positive and negative electrodes connecting the electric power storage device to the charger;

a third relay disposed on the first charging line; and a controller configured to perform an external charging control for charging the electric power storage device with the external electric power, wherein the second charging line is connected to the first connection line between the first relay and the DC/DC converter, and wherein the controller is configured to connect the electric power storage device and the charger to each other by turning ON the first relay and the third relay and perform a control such that the external electric power is supplied to the auxiliary machine battery via the DC/DC converter while controlling the second relay to be OFF.

6. The electric power storage system according to claim 2 further comprising:

a first charging line as one of positive and negative electrodes connecting the electric power storage device to the charger;

a second charging line as the other one of the positive and negative electrodes connecting the electric power storage device to the charger; and a third relay disposed on the first charging line, wherein the controller is configured to perform an external charging control for charging the electric power storage device with the external electric power, wherein the second charging line is connected to the first connection line between the first relay and the DC/DC converter, and wherein the controller is configured to connect the electric power storage device and the charger to each other by turning ON the first relay and the third relay and perform a control such that the external electric power is supplied to the auxiliary machine battery via the DC/DC converter while controlling the second relay to be OFF.

7. The electric power storage system according to claim 1, the vehicle being a hybrid vehicle provided with an engine as a driving source for traveling of the vehicle, the electric power storage system further comprising:

a generator connected to the converter and configured to generate electric power by receiving power of the engine;

a first current sensor configured to detect a current flowing through the converter; and a first failure detection unit configured to detect an ON failure of the second relay based on a current value detected by the first current sensor, wherein the first failure detection unit is configured to determine that the second relay is subjected to the ON failure when the current value detected by the first current sensor exceeds a predetermined value in a state where the first relay and the second relay are controlled to be OFF and in a state where the electric power generated by the generator is output to the DC/DC converter via the converter.

8. The electric power storage system according to claim 2 further comprising:

a generator connected to the converter and configured to generate electric power by receiving power of the engine;

a first current sensor configured to detect a current flowing through the converter; and a first failure detection unit configured to detect an ON failure of the second relay based on a current value detected by the first current sensor, wherein the first failure detection unit is configured to determine that the second relay is subjected to the ON failure when the current value detected by the first current sensor exceeds a predetermined value in a state where the first relay and the second relay are controlled to be OFF and in a state where the electric power generated by the generator is output to the DC/DC converter via the converter.

9. The electric power storage system according to claim 1 further comprising:

a second current sensor configured to detect a current flowing through the electric power storage device; and a second failure detection unit configured to detect an ON failure of the first relay based on a current value detected by the second current sensor, wherein the second failure detection unit is configured to determine that the first relay is subjected to the ON failure when the current value detected by the second current sensor exceeds a predetermined value in a state where the first relay and the second relay are controlled to be OFF and in a state where electric power is output to the DC/DC converter from the electric power storage device.

10. The electric power storage system according to claim 1 further comprising:

a first current sensor configured to detect a current flowing through the converter; and a first failure detection unit configured to detect an ON failure of the second relay based on a current value detected by the first current sensor, wherein the DC/DC converter is provided with a boosting function for boosting an output voltage of the auxiliary machine battery and outputting the boosted output voltage to the current path between the electric power storage device and the converter, and wherein the failure detection unit is configured to determine that the second relay is subjected to the ON failure when the current value detected during a boosting operation of the DC/DC converter exceeds a predetermined value in a state where the first relay and the second relay are controlled to be OFF.

11. The electric power storage system according to claim 1 further comprising:

a second current sensor configured to detect a current flowing through the electric power storage device; and a second failure detection unit configured to detect an ON failure of the first relay based on a current value detected by the second current sensor, wherein the second failure detection unit is configured to determine that the first relay is subjected to the ON failure when the current value detected by the second current sensor during a step-down operation of the DC/DC converter exceeds a predetermined value in a state where the first relay and the second relay are controlled to be OFF.

* * * * *